(12) United States Patent
Glass

(10) Patent No.: US 8,123,267 B2
(45) Date of Patent: Feb. 28, 2012

(54) LIFTING APPARATUS FOR TRUCK TIRES

(76) Inventor: Danny Lee Glass, Chickasha, OK (US)

( * ) Notice: Subject to any disclaimer, the term of this patent is extended or adjusted under 35 U.S.C. 154(b) by 357 days.

(21) Appl. No.: 12/483,316

(22) Filed: Jun. 12, 2009

(65) Prior Publication Data

US 2009/0311082 A1    Dec. 17, 2009

Related U.S. Application Data

(60) Provisional application No. 61/060,996, filed on Jun. 12, 2008.

(51) Int. Cl.
*B65G 7/12* (2006.01)
(52) U.S. Cl. .............................. 294/17; 294/15; 414/426
(58) Field of Classification Search .................... 294/17, 294/15; 254/15, 94, 131; 414/426, 427, 414/428, 429, 430
See application file for complete search history.

(56) References Cited

U.S. PATENT DOCUMENTS 151,685 A  *  6/1874  Coss .............................. 294/106

(Continued)

*Primary Examiner* — Saul Rodriguez
*Assistant Examiner* — Gabriela Puig
(74) *Attorney, Agent, or Firm* — Tomlinson Rust McKinstry Grable

(57) ABSTRACT

A tool for lifting truck tires from a prone position to an upright position. The tool has a frame which extends over the length of a truck tire to a leverage point at one end of the tire. The frame is attached to a plate which is adapted to slide underneath the other side of the truck tire. Two handles extend from the frame at an angle and a length to allow maximum leverage for an operator of the tool. The frame may have many shapes, but preferably is angled to exert force at a point opposite the plate.

14 Claims, 3 Drawing Sheets

U.S. PATENT DOCUMENTS 5,265,661 A * 11/1993 Tran ............................... 157/1.3
5,466,026 A * 11/1995 Steiner ........................... 294/17
2007/0210595 A1 * 9/2007 Quiles et al. .................... 294/17

* cited by examiner

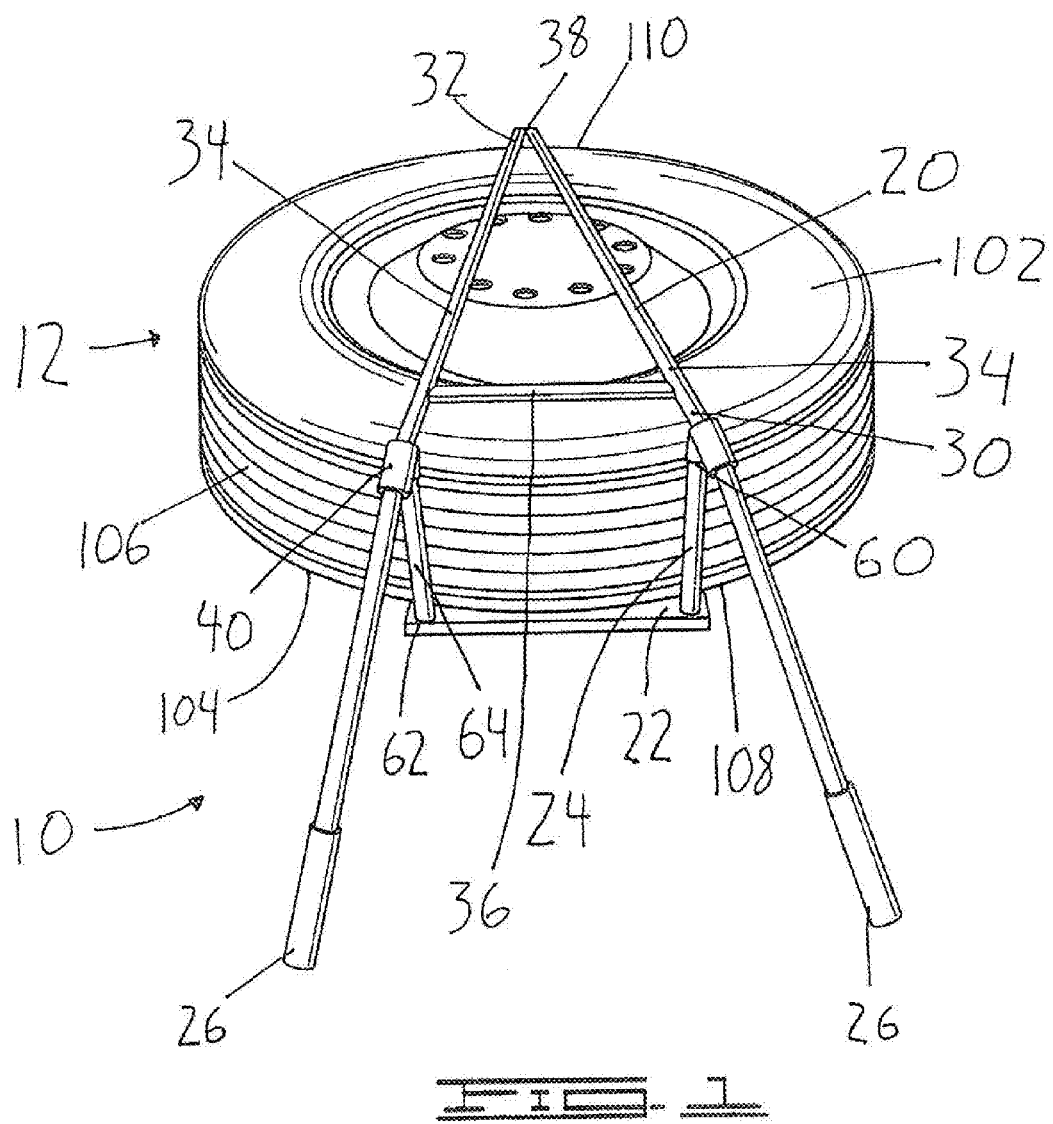

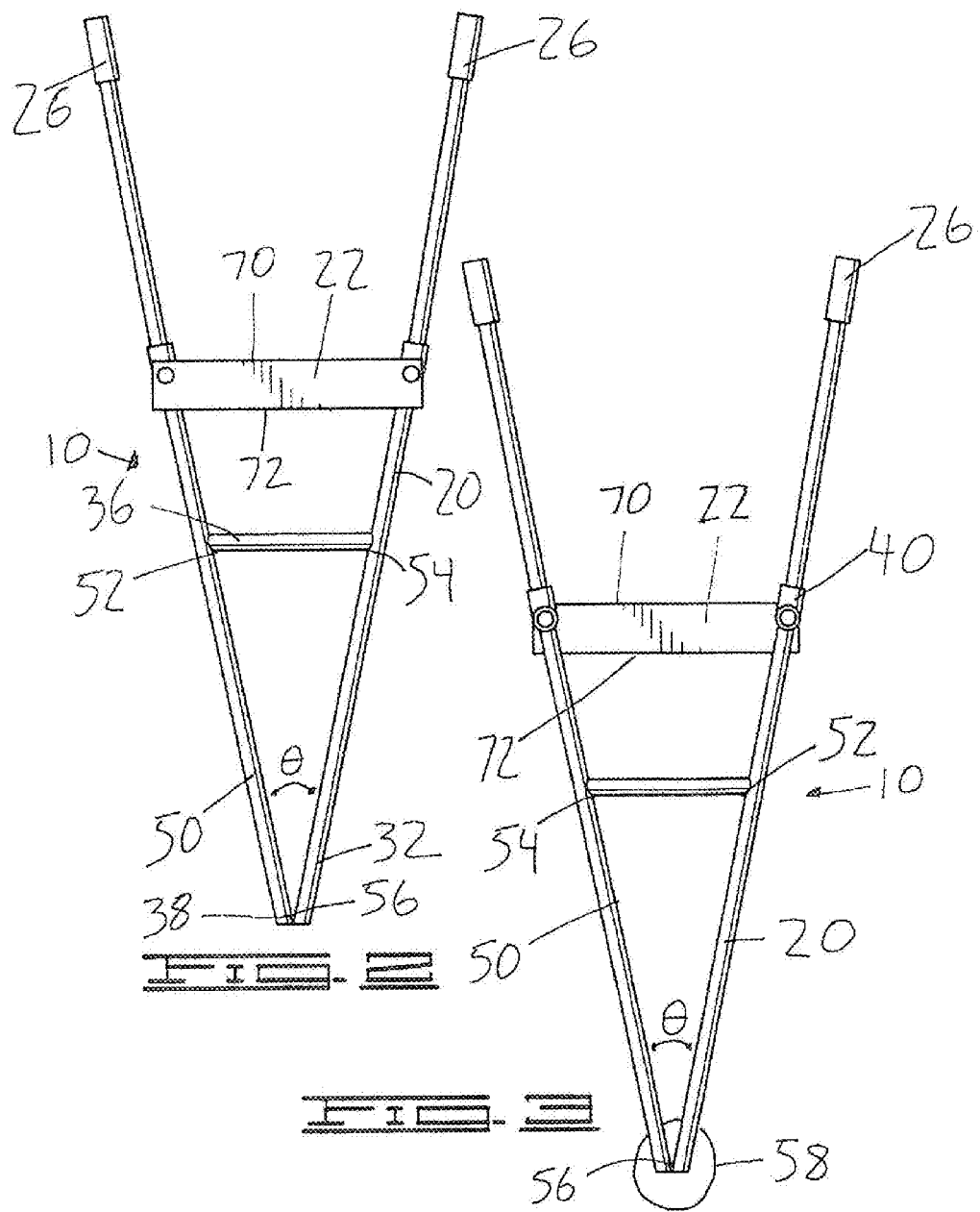

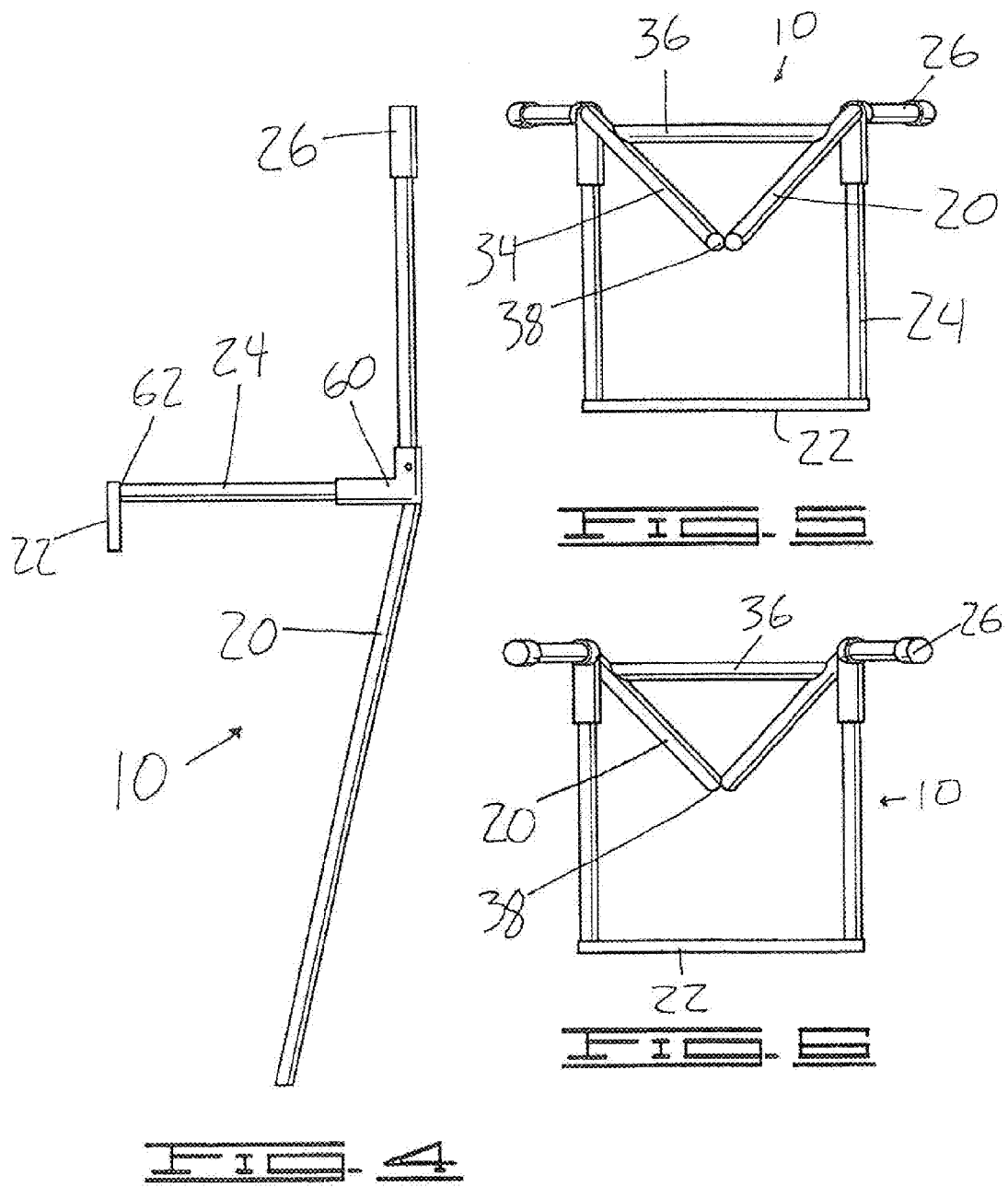

LIFTING APPARATUS FOR TRUCK TIRES

CROSS REFERENCE TO RELATED APPLICATION

This application claims the benefit of U.S. Provisional Application No. 61/060,996 filed Jun. 12, 2008, the contents of which are incorporated fully herein by reference.

FIELD OF THE INVENTION

The present invention relates to vehicle maintenance generally, and specifically to tools for manipulating and moving tires.

SUMMARY OF THE INVENTION

This invention is directed to a tool for manipulating a truck tire. The tool comprises a plate, a tire brace frame, two handles connected to the brace frame, and a plate connector. The plate connector defines a first and a second end. The plate connector is connected to the tire brace frame at the first end and the plate at the second end.

Another embodiment of the invention is directed to a tool for manipulating a truck tire. The truck tire defines a top side, a bottom side, and a generally circular tread. The tool comprises a plate, a tire brace frame, and a plate connector. The plate is adapted to be placed above the top side of the truck tire. The tire brace frame is adapted to be placed below the bottom side of the truck tire. The plate connector connects the tire brace frame to the plate proximate the tread.

BRIEF DESCRIPTION OF THE DRAWINGS

FIG. 1 is perspective view of the tool of a lifting apparatus for use with a truck tire.

FIG. 2 is a bottom view of the invention shown in FIG. 1.
FIG. 3 is a top view of the invention shown in FIG. 1.
FIG. 4 is a side view of the invention shown in FIG. 1.
FIG. 5 is a front view of the invention shown in FIG. 1.
FIG. 6 is a back view of the invention shown in FIG. 1.

DETAILED DESCRIPTION OF THE DRAWINGS

Tires for commercial trucks and 18-wheelers are heavy and require great physical strain to both lift to an upright position and lower to a prone position. Much routine maintenance of large trucks must be performed by the truck drivers themselves, who may be unable to exert the forces necessary to manipulate truck tires in the manner required. The present invention, as depicted in FIG. 1, utilizes leverage in a design to enable a tire to be lifted and lowered between a prone and upright position with ease.

Turning to the drawings in general and FIG. 1 in particular, shown therein is an apparatus for lifting truck tires, or tool 10 in conjunction with a truck tire 12. The tool 10 comprises a tire brace frame 20, a plate 22, a plate connector 24, and a plurality of handles 26. The frame 20 is defined by a first end 30 and a second end 32 and the frame comprises two support beams 34 and at least one cross beam 36. The two support beams 34 preferably meet at a leverage point 38 proximate the second end 32. The leverage point 38 may be a simple weld, or an additional structure, such as a plate, wheel, or bolt. Further, the leverage point 38 may comprise a beam (not shown) having a length at which the leverage is applied to the tire 12. The at least one cross beam 36 extends between the two support beams 34. The cross beam 36 provides stability to the frame 20.

The plurality of handles 26 is attached to the frame 20 proximate the first end 30 of the frame. Preferably, the handles 26 are not co-planar with the frame 20 such that the tool 10 is economically designed for lifting. More preferably, the angle between the frame 20 and the handles 26 is greater than 145 degrees. Preferably, the handles 26 are at least as long as the brace frame 22. Each handle 26 is attached to the frame 10 at one of the two support beams 34 at an attachment point 40. The attachment point 40 may not at the same point as the cross beam 36, resulting in an A-shaped frame 10, as depicted in FIG. 1. Alternatively, the attachment point 40 may be the same point at which the cross-beam 36 connects the two support beams 34, resulting in a triangular frame (not shown). In a further alternative, the leverage point 38 may comprise a beam having a length such that the frame 20 is rectangular or trapezoidal in shape. Preferably, the farthest distance between the handles 26 is greater than a length of the plate 22. More preferably, the farthest distance between the handles 26 is 44% greater than the length of the plate 22.

Turning now to FIG. 2, the frame 20 defines a triangular portion 50 defined by the cross beam 36 and the support beams 34. The triangular portion 50 defines a first corner 52, a second corner 54 and a third corner 56. The handles 26 are connected to the frame 20 proximate the first 52 and second 54 corners. The third corner comprises the leverage point 38. As shown in FIG. 3, the third corner may further comprise a wheel 58. Preferably, the third corner 56 defines an angle θ with a measurement between 22 and 33 degrees. More preferably, the third corner 56 defines an angle θ with a measurement of 27 degrees.

With reference again to FIG. 1, the plate connector 24 is attached to the frame 20 proximate the first end 30 of the frame. The plate connector 24 defines a first end 60 and a second end 62. The plate connector 24 extends from the frame 20 at the first end 60 of the plate connector a perpendicular distance roughly equal to the width of a tread of a truck tire to connect with the plate 22 at the second end 62. As shown, the plate connector 24 is connected to the frame 10 closer to the first end 30 of the frame than the cross beam 36. As shown in FIG. 1, the plate connector 24 comprises two plate connector beams 64. Alternatively, the plate connector 24 could comprise an alternative means, such as a molded structure, lattice, or a different number of beams. Further, in an alternative embodiment (not shown), the plate connector 24 may extend from the cross beam. As shown in FIG. 4, the plate connector 24 is perpendicular to the plate 22. Alternatively, the plate connector 24 may be perpendicular to the frame 20 or non-perpendicular to the frame and the plate 22.

Turning now to FIGS. 2 and 3, the plate 22 comprises a first end 70 and a second end 72. The plate 22 is connected to the plate connector 24 at the first end 70 of the plate. The second end 72 of the plate 22 extends in the direction of the second end 32 of the frame 20. The plate 22 is thin such that it can slide between a floor surface and the truck tire 12 (FIG. 1), but made of a sufficiently strong material, such as steel or other metals, such that the plate can bear much of the force of lifting the track tire. As shown in FIG. 4, the plate 22 is parallel to one of the plurality of handles 26. Alternatively, the plate 22 may be parallel to the frame 20, or non parallel to the frame or handles 26.

With reference again to FIG. 1, in operation, the tool 10 is lowered to a generally horizontal position proximate a prone truck tire 12 with the plate 22 contacting the floor surface. The truck tire 12, in its prone position, comprises a top side 102, a bottom side 104, and a generally circular tread 106. The truck tire 12 further comprises a first end 108 and a second end 110. The frame 20 is slid over the top side 102 of the truck tire 12 and the plate 22 is slid under the bottom side 104 of the first end 108 of the truck tire until the tread 106 of the truck tire contacts the plate connector 24. Preferably, the frame 20 is placed on the top side 102 of the truck tire 12 proximate a diameter of the truck tire. The leverage point 38 contacts the truck tire 12 proximate the second end 110. The handles 26 are utilized to lift the tire 12 from the prone position to an upright position. As the tire 12 is lifted, the plate 22 provides lifting force on the bottom side 104 of the tire, while the frame 20 provides a pushing force at the top side 102 of the prone tire to hold it in place and provide leverage. Preferably, the frame exerts the pushing force primarily at the leverage point 38. The tire 12 is lifted until the tread 106 of the truck tire is contacting the ground such that a center of mass of the truck tire is located above a point where the tread contacts the ground. Finally, the tool 10 may be removed from the truck tire 12 and the tire moved further by rolling for attachment to a truck.

In further operation, the tool 10 may be used to lower an upright truck tire 12 to the ground in a controlled manner. The tool 10 is placed along the tread 106 of an upright tire 12 such that the tread contacts the plate connector 24. The handles 26 are used to lower the tire 12 such that the plate 22 is below the bottom side 104 of the tire and the frame 20 is above the top side 102 of the tire. When the tire 12 is lowered to a horizontal position, the plate 22 is caused to slide out from under the tire and the tool 10 removed.

Various modifications in the design and operation of the present invention are contemplated without departing from the spirit of the invention. Thus, while the principal preferred construction and modes of operation of the invention have been illustrated and described in what is now considered to represent its best embodiments it should be understood that the invention may be practiced otherwise than as specifically illustrated and described.

What is claimed is:

1. A tool for manipulating a truck tire, the tool comprising:
   a plate;
   a tire brace frame, wherein the tire brace frame comprises a wheel;
   two handles connected to the brace frame; and
   a plate connector defining a first end and a second end, wherein the plate connector is connected to the tire brace frame at the first end and the plate at the second end.

2. The tool of claim 1 wherein the perpendicular distance between the plate and the tire brace frame is approximately the width of a truck tire.

3. The tool of claim 1 wherein the handles are not coplanar with the tire brace frame.

4. The tool of claim 1 wherein the frame comprises a cross beam, a first lever, and a second lever.

5. The tool of claim 4 wherein the first lever and second lever meet at a leverage point.

6. The tool of claim 5 wherein the angle between the first lever and the second lever at the leverage point is between 22 and 33 degrees.

7. The tool of claim 5 wherein the angle between the first lever and the second lever at the leverage point is 27 degrees.

8. The tool of claim 1 wherein the two handles are at least as long as the brace frame.

9. The tool of claim 1 wherein the plate connector is not perpendicular to the plate.

10. The tool of claim 1 wherein the tire brace frame comprises a triangular portion and the triangular portion defines a first corner, a second corner and a third corner, wherein one of the two handles is connected to the tire brace frame proximate the first corner and the second of the two handles is connected proximate the second corner.

11. The tool of claim 10 wherein the third corner comprises the wheel.

12. The tool of claim 10 wherein the third corner comprises a leverage point.

13. The tool of claim 1 wherein the tire brace frame is substantially parallel to the plate.

14. The tool of claim 1 wherein the wheel is connected to the tire brace frame opposite the two handles.

* * * * *